J. R. FOUCH.
METALLIC WHEEL.
APPLICATION FILED NOV. 14, 1907.
907,587.
Patented Dec. 22, 1908.
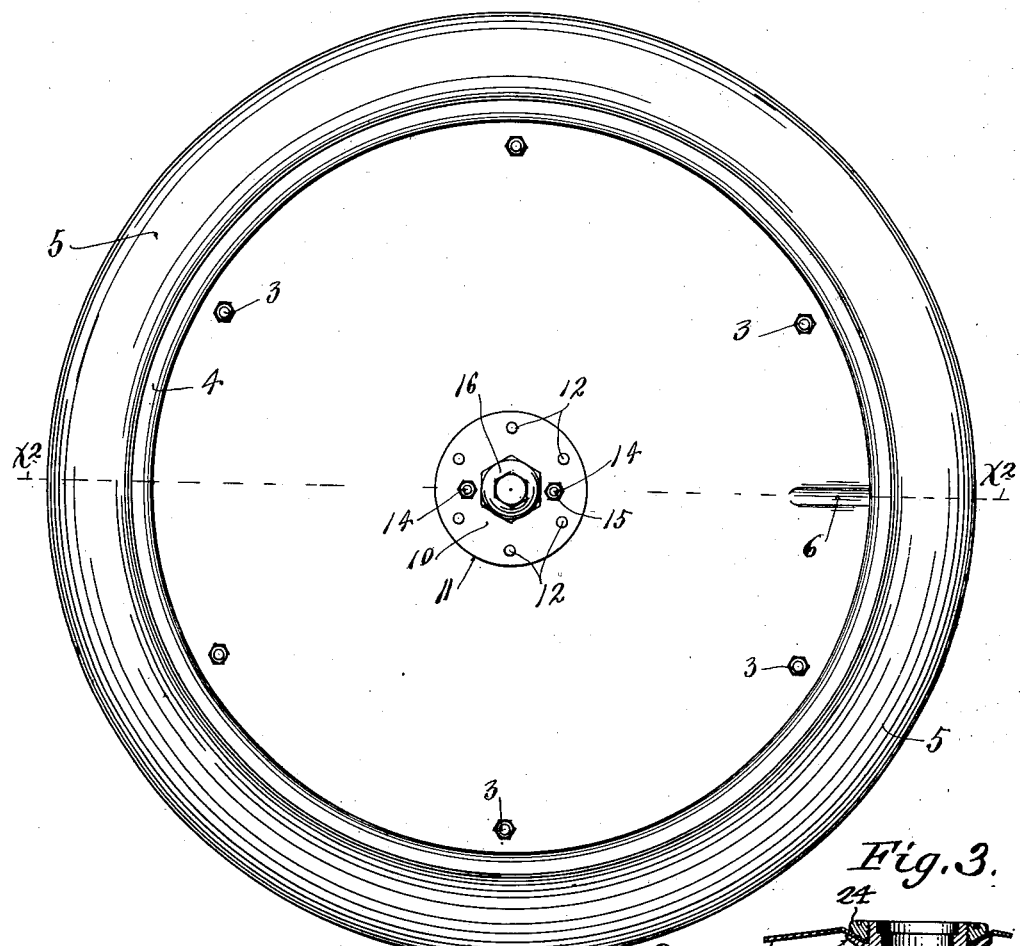
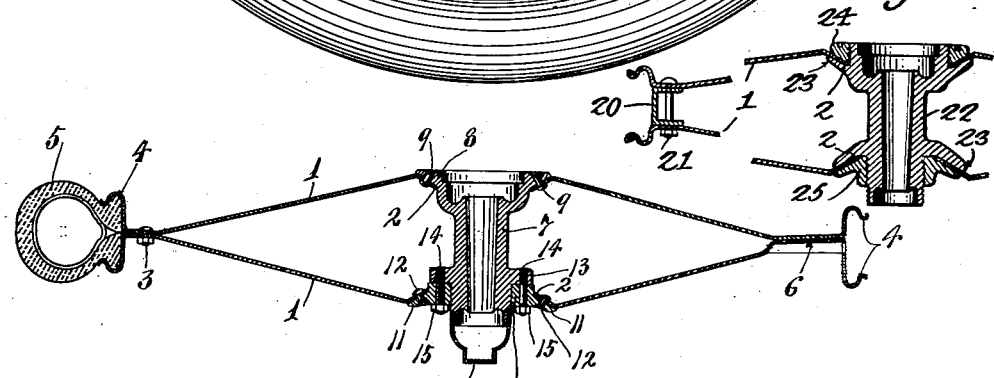
Witnesses.
A. H. Opsahl.
L. L. Simpson
Inventor.
James R. Fouch
By his Attorneys.
Williamson Merchant

UNITED STATES PATENT OFFICE.

JAMES R. FOUCH, OF MINNEAPOLIS, MINNESOTA.

METALLIC WHEEL.

No. 907,587.  Specification of Letters Patent.  Patented Dec. 22, 1908.

Application filed November 14, 1907. Serial No. 402,112.

*To all whom it may concern:*

Be it known that I, JAMES R. FOUCH, a citizen of the United States, residing at Minneapolis, in the county of Hennepin and State of Minnesota, have invented certain new and useful Improvements in Metallic Wheels; and I do hereby declare the following to be a full, clear, and exact description of the invention, such as will enable others skilled in the art to which it appertains to make and use the same.

My invention has for its object to provide an improved metallic wheel adapted for general use, but particularly adapted for use in connection with automobiles.

To the above ends the invention consists of the novel devices and combinations of devices hereinafter described and defined in the claim.

In the accompanying drawings which illustrate the invention, like characters indicate like parts throughout the several views.

Referring to the drawings, Figure 1 is a view in side elevation. Fig. 2 is a horizontal section taken approximately on the line $x^2\ x^2$ of Fig. 1; and Fig. 3 is a view corresponding to Fig. 2, but illustrating a modified construction of the wheel.

Describing first the construction illustrated in Figs. 1 and 2, the numeral 1 indicates a pair of reversely bulged conical pressed steel plates which, at their central portions, are provided with quite large axial passages, immediately surrounding which the said plates are formed with conical flanges 2. While these conical flanges may, so far as the broad idea of the invention is concerned, be turned either inward or outward of the projected conical surfaces of the plates 1, by far the best results are obtained by turning both of the said conical flanges 2 inward. The outer portions of the two conical plates 1 are brought together and are detachably connected by suitable devices, but preferably by short nutted bolts 3, the heads of which are soldered or brazed to one of the said conical plates so as to prevent displacement thereof when the two conical plates of the wheel are separated.

Outward of the circumferentially spaced row of nutted bolts 3 the conical plates 1 are provided with reversely projected tire-clamping flanges 4, which together constitute a separable peripheral channel-shaped rim that is adapted to clamp and hold the ribbed inner portion of a pneumatic tire 5 of standard construction. At a suitable point adjacent to the divided rim 4, one of the conical plates 1 is provided with an approximately semitubular depression 6 that affords a passage through which the valved charging tube (not shown) of the tire may project inward and through said rim.

The conical flanges 2 of the conical plates 1 are secured to a hub 7 that extends through the axial passage thereof. This hub 7, at one end, is provided with an integrally formed flange 8, the inner surface of which is conical, closely fits the conical flange 2 of the adjacent conical plate 1 and is secured thereto by rivets 9. At its other end the hub 7 is provided with a telescopically detachable clamping collar 10 which has a conical flange 11, the inner surface of which closely engages the conical flange 2 of the adjacent conical plate 1, and which flanges 2 and 11 are rigidly secured together by rivets 12. The clamping collar 10 is rigidly secured to a flange 13 on the hub 7, as shown, by means of studs 14 that are secured to said flange 13, project through perforations in said collar 10 and are provided with nuts 15 that engage the outer surface of said collar.

When the coöperating relatively fixed and movable flanges 8 and 11 of the hub 7 are tightly drawn against the inwardly bulged conical flanges 2 of the conical plates 1, the hub is centered in respect to the wheel plates, and as the said conical hub flanges are drawn into the conical plate flanges 2, they tend to draw together the central portions of the reversely bulged conical wheel plate, but this entire force is resisted by a straight end or radial thrust on the said wheel plates. When this action is considered it will be evident that reversely bulged wheel plates of truly conical form will be much more difficult to buckle than reversely bulged wheel plates of elliptical concavo convex form. Also it will be noted that the inwardly turned plate flanges 2 form the best possible kind of joints with the conical hub flanges and are best adapted to withstand the lateral pressure therefrom. In fact, the joints thus made are so firm and rigid that in some instances it is not necessary to use rivets or bolts to connect the said conical flanges.

The wheel shown in Figs. 1 and 2 has a hub that is adapted to be journaled to an axle, but in some cases, such as for traction wheels, where the axle is driven, these hubs would be rigidly secured to or even formed as part of the axle. The numeral 16 indicates a detachable cap applied to the outer end of the hub 7.

As is evident, all that is necessary in applying a tire to the wheel or in removing a tire therefrom, is to first remove the nuts of the bolts 3 and 14 and then remove the collar 10 and connected wheel plate 1 laterally from working position. This is an easy operation and may be very quickly performed.

In the construction illustrated in Fig. 3, the conical wheel plates 1 are substantially identical with those shown in Figs. 1 and 2, but their outer portions are spaced apart by an annular spacing rim 20 which, as shown, is channel-shaped in cross section. Nutted bolts 21 are passed through perforations in the wheel plates 1 and in the flanges of the spacing rim 20 and rigidly secure said parts together. The wheel hub 22 in this construction is provided with conical flanges 23 that engage the inner surfaces of the conical flanges 2 of the wheel plates 1. Outward of the flanges 23 the hub 22 is externally threaded and provided at its inner end with a threaded clamping collar 24 and at its outer end with a threaded clamping collar 25. These clamping collars 24 and 25 have conical surfaces that engage the conical outer surfaces of the plate flanges 2 and rigidly clamp the same against the coöperating hub flanges 23.

The construction shown in Fig. 3 is especially well adapted for use in wheels that must withstand heavy loads. A spacing rim 20 adds greatly to the strength of the periphery or rim portion of the wheel and adapts the wheel rim to hold very large pneumatic or solid tires; and the hub construction very rigidly holds the conical plate flanges 2 and reinforces the latter.

What I claim is:

In a wheel, the combination with outwardly bulged conical plates rigidly but detachably secured at their outer extremities and provided with means for holding a tire, and at their central portions having inturned conical flanges surrounding axial hub passages, and a hub seated in the hub passages of said plates and provided with inner and outer conical flanges engaging the inturned conical flanges of said plates, and rigidly clamping the same, substantially as described.

In testimony whereof I affix my signature in presence of two witnesses.

JAMES R. FOUCH.

Witnesses:
  H. D. KILGORE,
  F. D. MERCHANT.